US009516708B2

(12) United States Patent
Vonach et al.

(10) Patent No.: US 9,516,708 B2
(45) Date of Patent: Dec. 6, 2016

(54) METHOD FOR OPERATING AN LLC RESONANT CONVERTER FOR A LIGHT-EMITTING MEANS, CONVERTER, AND LED CONVERTER DEVICE

(71) Applicant: TRIDONIC GMBH & CO KG, Dornbirn (AT)

(72) Inventors: Christoph Vonach, Dornbirn (AT); Eduardo Pereira, Siebnen (CH)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 14/391,029

(22) PCT Filed: Apr. 15, 2013

(86) PCT No.: PCT/AT2013/000065
§ 371 (c)(1),
(2) Date: Oct. 7, 2014

(87) PCT Pub. No.: WO2013/152368
PCT Pub. Date: Oct. 17, 2013

(65) Prior Publication Data
US 2015/0077003 A1    Mar. 19, 2015

(30) Foreign Application Priority Data

Apr. 13, 2012    (DE) .................. 10 2012 007 477

(51) Int. Cl.
*H05B 33/08*    (2006.01)
*H02M 3/337*    (2006.01)
(Continued)

(52) U.S. Cl.
CPC ....... *H05B 33/0815* (2013.01); *H02M 3/3376* (2013.01); *H02M 3/33507* (2013.01);
(Continued)

(58) Field of Classification Search
CPC .......... H05B 33/0815; H05B 33/0803; H05B 37/029; H05B 41/28; H05B 41/2827; H05B 41/2325; H05B 41/2928; Y02B 70/126; Y02B 20/204; Y02B 20/208; Y02B 70/1433; Y02B 70/1458; H02M 3/33569; H02M 3/3376; H02M 3/3385; H02M 3/34
USPC ............... 315/291, 294, 247, 246, 244, 276, 315/209 R, 307, 312; 363/16, 17, 19
See application file for complete search history.

(56) References Cited

U.S. PATENT DOCUMENTS 6,721,191 B2 * 4/2004 Duerbaum ........ H02M 3/33561
363/127
6,934,166 B2 * 8/2005 Vinciarelli ............ H02M 1/088
363/17

(Continued)

FOREIGN PATENT DOCUMENTS

DE    102010031244 A1    9/2011
DE    102011007229 A1    11/2011
(Continued)

*Primary Examiner* — Haissa Philogene
(74) *Attorney, Agent, or Firm* — Volpe and Koenig, P.C.

(57) ABSTRACT

An LLC resonant transformer (19) for a lamp (5) comprises a primary circuit (19) and a secondary side (30) galvanically isolated therefrom. During operation of the LLC resonant transformer (19), a first switch (21) and a second switch (22) of a half-bridge to which an LLC resonant circuit (25-27) of the primary circuit (19) is connected are actuated in a clocked fashion. A load (5) to which an output (35) on the secondary side (30) supplies energy is detected on the basis of a measured variable (iavg) acquired in the primary circuit (20). The half-bridge (21, 22) is variably controlled on the basis of the measured variable (iavg) that is acquired in the primary circuit (20) and indicates the load (5).

9 Claims, 7 Drawing Sheets

(51) Int. Cl.
*H02M 3/335* (2006.01)
*H05B 37/02* (2006.01)
*H02M 1/00* (2006.01)

(52) U.S. Cl.
CPC ...... *H05B33/0842* (2013.01); *H05B 37/0209* (2013.01); *H02M 2001/0019* (2013.01); *H02M 2001/0058* (2013.01); *Y02B 20/348* (2013.01); *Y02B 70/1433* (2013.01); *Y02B 70/1491* (2013.01)

(56) References Cited

U.S. PATENT DOCUMENTS

| | | | | |
|---|---|---|---|---|
| 8,525,429 | B2* | 9/2013 | Schlenk | H05B 41/2828 |
| | | | | 315/219 |
| 8,665,611 | B2* | 3/2014 | Gong | H02M 3/33592 |
| | | | | 323/286 |
| 9,060,406 | B2* | 6/2015 | Pereira | H05B 33/0815 |
| 9,220,150 | B2* | 12/2015 | Hartmann | H02J 9/02 |
| 2010/0123404 | A1 | 5/2010 | Chen et al. | |
| 2011/0149607 | A1 | 6/2011 | Jungreis et al. | |
| 2011/0260631 | A1* | 10/2011 | Park | H05B 33/0815 |
| | | | | 315/165 |
| 2011/0266969 | A1 | 11/2011 | Ludorf | |
| 2011/0317452 | A1 | 12/2011 | Anguelov et al. | |
| 2012/0033453 | A1 | 2/2012 | Gong | |
| 2013/0193849 | A1 | 8/2013 | Zimmermann et al. | |
| 2015/0028761 | A1* | 1/2015 | Vonach | H05B 33/0815 |
| | | | | 315/201 |

FOREIGN PATENT DOCUMENTS

| | | |
|---|---|---|
| KR | 20120014320 A1 | 2/2012 |
| WO | 2006103606 A1 | 10/2006 |
| WO | 2010065598 A2 | 6/2010 |
| WO | 2011060701 A1 | 5/2011 |
| WO | 2013092656 A1 | 6/2013 |
| WO | 2013092662 A1 | 6/2013 |

* cited by examiner

METHOD FOR OPERATING AN LLC RESONANT CONVERTER FOR A LIGHT-EMITTING MEANS, CONVERTER, AND LED CONVERTER DEVICE

FIELD OF THE INVENTION

The invention relates to a converter for supplying power to a light-emitting means, to an LED converter device and to a method for operating such a converter. The invention relates in particular to those apparatuses and methods in which energy is supplied to a light-emitting means, in particular a light-emitting means which comprises one or more light-emitting diodes, using a so-called SELV ("Separated Extra-Low Voltage" or "Safety Extra-Low Voltage") device.

BACKGROUND

Converters with electrical isolation are used for the galvanically decoupled transfer of electrical energy from an input side to an output side. Such converters are used in various applications for current or voltage supply, such as, for example, in clocked switched-mode power supplies. In the case of clocked converters, controllable switches which can be in the form of power switches are used and operated in clocked fashion in order to transfer electrical energy onto the output side. Galvanically decoupled energy transfer can be achieved by using a transformer or another transfer device. Such galvanic isolation or electrical isolation is required in the case of operating devices for light-emitting means for safety reasons in order to isolate an ELV ("Extra-Low Voltage") region from regions with a higher supply voltage, in particular mains voltage, by means of a so-called potential barrier or SELV barrier.

Converters which are in the form of so-called resonant converters which have a resonant circuit can be used to operate light-emitting means. The resonant circuit can be a series or parallel resonant circuit. When configuring converters, one aim is to keep losses low. Resonant converters which comprise an LLC resonant circuit having two inductances and one capacitance can be controlled in resonant or quasi-resonant fashion on the primary side. Such converters have the advantage that energy-efficient operation with relatively low switching losses is possible.

Converters for light-emitting means or operating devices which comprise such converters can be configured or operated as a constant current source (also referred to as FCC or "Fixed Constant Current" device) or a constant voltage source (also referred to as FCV or "Fixed Constant Voltage" device). Constant voltage sources can be used, for example, for LED modules which have electronics in order to ensure a corresponding power supply to the LEDs with a predetermined current from the output voltage provided by the constant voltage source.

When the constant voltage source for operating LEDs is manufactured, the number of LEDs for which the corresponding converter is intended to be used is generally not yet known. If the converter is optimized for a specific number or type of LEDs or a specific LED module, a corresponding indication can be provided to the user of the converter for said converter only to be used given the respective type of LEDs or the corresponding LED module. However, it is not ensured that the user will stick to this instruction. It is therefore desirable to specify converters which can automatically identify a load connected to the output of the converter. This makes it possible to adapt the operation of the converter to the load, if necessary.

One approach for load identification consists in a measurement which is performed at the output or at another suitable point in the secondary side of the converter. The voltage detected on the secondary side can then be fed back to the primary side via an insulator. Bypassing of the SELV barrier requires corresponding components which increase the installation space and/or costs of the operating device. US 2012/0033453 A1 describes an example of a resonant converter which comprises a half-bridge and an LLC circuit and in which an insulator is provided in order to feed back a variable measured on the output side to the input side. US 2012/0033453 A1 also describes an example of a resonant converter in which switches in the secondary side of the converter are controlled. This requires corresponding circuit components, in particular power switches, on the secondary side. It would be desirable to realize load identification which enables adaptation of the operation of the converter to the identified load in a simple manner. In particular, it would be desirable to realize load identification and adaptation of the operation of the converter to the identified load without a measurement needing to be carried out on the secondary side for this purpose.

There is a demand for apparatuses and methods which offer improvements in respect of the mentioned aims. In particular, there is a need for apparatuses and methods in which the complexity in terms of circuitry and/or the costs which are associated with conventional apparatuses for bypassing the SELV barrier can be reduced or avoided. There is also a need for such apparatuses and methods which enable efficient energy transfer.

SUMMARY

In accordance with the invention, a method, a converter and an LED converter device having the features specified in the independent claims are specified. The dependent claims define embodiments.

In accordance with exemplary embodiments of the invention, an LLC resonant converter which comprises a primary-side half-bridge operated in a clocked fashion and an LLC resonant circuit is operated in such a way that a measured variable is detected on the primary side, from which measured variable the load which is coupled to an output of a secondary side of the LLC resonant converter can be determined. The detection of the load is performed on the basis of the measured variable detected in the primary-side circuit. The measured variable can correspond to an average value for a current flowing in the half-bridge circuit from the LLC resonant circuit to ground over time. The measured variable can also be proportional to such a current and, for example, correspond to the average value for the current through a shunt resistor over time or the voltage drop across the shunt resistor. These variables enable the determination of the power transferred by the LLC resonant converter and can therefore be used for detecting the load. Depending on the detected load, the control of the half-bridge can be adapted. This enables the at least partial compensation of load-dependent influences on the output voltage. The (average) output voltage can be kept to an at least approximately load-independent value. The LLC resonant converter can be operated as constant voltage source.

In accordance with exemplary embodiments, therefore, a measured variable detected in the primary-side circuit of the LLC resonant converter can be processed in order to obtain information on the load. Detection of the load on a secondary side and feedback via the SELV barrier is no longer absolutely necessary. Load-dependent changes in the output voltage can be at least partially compensated for without the load or a variable characterizing said load needing to be detected on the secondary side and/or without active control of, for example, power switches needing to take place on the secondary side.

In accordance with one exemplary embodiment, a method for operating an LLC resonant converter for a light-emitting means is specified. The LLC resonant converter has a primary-side circuit, which comprises a half-bridge and an LLC resonant circuit, and a secondary side which is galvanically isolated therefrom. In the method, control of the half-bridge is performed by clocked switching of switches in the half-bridge. A load which is supplied energy from an output of the secondary side is detected on the basis of the measured variable detected in the primary-side circuit. The control of the half-bridge is adapted on the basis of the measured variable detected in the primary-side circuit.

The method makes use of the fact that, in the case of the LLC resonant converter, measured variables which are detected on the primary side can provide information on the load which is connected to the output of the converter. This makes it possible to obtain information on the transferred power and therefore on the load even without any measurement on the secondary side.

The converter can be operated as a constant voltage source or FCV ("Fixed Constant Voltage") device. The converter can be configured as a device with electrical isolation, in which an SELV region and a non-SELV region are isolated by an SELV barrier.

The measured variable can be determined while the half-bridge is operated in a previously known manner. The measured variable can in particular be determined while a first switch and a second switch of the half-bridge are switched in a clocked fashion alternately with a preset, fixed frequency.

The control of the half-bridge can be adapted in such a way that a load-dependent shift in an output voltage of the LLC resonant converter is at least partially compensated for.

The adaptation of the control of the half-bridge can comprise setting of clocking of the switches of the half-bridge. In particular, a frequency at which a first switch and a second switch of the half-bridge are switched in clocked fashion can be set. As a result, it is possible, for example, if a load-dependent reduction in the output voltage is identified, to compensate for this at least partially by virtue of the fact that the switching frequency of the switches is set to a new value at which the gain of the converter becomes greater for the corresponding load, i.e. for this to move closer to the frequency at which the gain has its maximum as a function of the frequency for the corresponding load. Similarly, it is possible, for example, if a load-dependent increase in the output voltage is identified, to compensate for this at least partially by virtue of the fact that the switching frequency of the switches is set to a new value at which the gain of the converter becomes smaller for the corresponding load, i.e. for it to move further away from the frequency at which the gain has its maximum as a function of the frequency for the corresponding load.

A control device can set the frequency automatically depending on the measured variable using a table value query and/or by computer-based processing of the measured variable. The control device can be configured as an integrated semiconductor circuit. The control device can be configured as an application-specific special circuit (ASIC: "Application-Specific Integrated Circuit") or another chip.

The table values and/or the computer-based processing can be implemented in such a way that they are dependent on a load dependence of the output voltage which occurs during permanent clocking of the half-bridge. As a result, load-dependent variations in the output voltage can be effectively reduced. The table value query and/or the computer-based processing can be implemented in such a way that, in the case of the correspondingly changed control of the half-bridge, for example by selection of a new switching frequency of the switches, the discrepancy between the output voltage and a target value is less than a threshold value. The table values and/or the computer-based processing can be established depending on a theoretical model of the LLC resonant converter and/or depending on measurements at an LLC resonant converter. The table values and/or the computer-based processing can be implemented in such a way that, for example, a new switching frequency for the switches in the half-bridge can be determined from the measured variable detected on the primary side.

The measured variable detected in the primary-side circuit can be proportional to an average value of a current. The measured variable detected in the primary-side circuit can be proportional to an average value of a current flowing through a primary coil in the state of the half-bridge in which the switch is switched on the low-potential side. A measured variable which is proportional to this current can be tapped off at a suitable point and averaged in analog or digital fashion. For this purpose, for example, an average value of a current through a resistor, which is connected between a switch of the half-bridge and ground, or an average value of the voltage drop across the resistor can be used as measured variable. This measured variable is detected on the primary side and can be used for detecting the load. A shunt resistor of the circuit can be used as measuring resistor at which the average value of the current is detected.

In addition, a peak value of the current can be detected. This peak value can be used for the activation of overcurrent protection. A threshold value comparison can be performed for the peak value. If it is identified that the overcurrent protection is intended to be activated, the frequency at which the switches in the half-bridge are switched can be changed in such a way that the gain of the LLC resonant converter is reduced.

A supply voltage of the primary-side circuit can be detected with time resolution. The control of the half-bridge can be changed depending on a change in the supply voltage over time.

Clocking of the half-bridge can be changed depending on a ripple of the supply voltage of the primary-side circuit in a time-dependent, in particular periodic, manner. The clocking of the half-bridge can be changed periodically with a time period which corresponds to the time period of the ripple of the supply voltage. In this way, ripple in the output voltage or in the output current of the LLC resonant converter can be reduced. Furthermore, the associated spectral peak is extended by the change in the switching frequency which varies over time in the frequency domain, which results in an improved response in respect of electromagnetic interference (EMI).

The control device which drives the half-bridge and which performs the adaptation of the control of the half-bridge, can additionally also perform the compensation of time-dependent effects of the supply voltage of the primary-side circuit, which is also referred to as bus voltage. The present value for the supply voltage of the primary-side circuit can be sampled at a rate which is greater than the frequency of the ripple. The control device can change the switching frequency of the switches of the half-bridge automatically in accordance with the ripple of the bus voltage.

Alternatively or additionally, the control device can be configured to introduce a procedure for limiting the output power depending on the measured variable.

Alternatively or additionally, the control device can be configured to implement fault detection depending on the measured variable and to initiate a fault operating state in the event that a fault state is detected. Examples of faults detected by the control device include a short circuit and/or an open circuit at the output of the converter. The fault operating state can be implemented in such a way that the control device outputs a signal which indicates the fault, initiates a safety shutdown and/or initiates other measures which prevent impermissible operating states of the converter.

As an alternative or in addition, the control device can be configured to output a signal which contains information on the identified load depending on the measured variable. Such a signal can be, for example, a signal generated in accordance with the DALI ("Digital Addressable Lighting Interface") standard, for example a data telegram. The signal can be generated in response to a corresponding DALI query.

In accordance with a further exemplary embodiment, a converter for a light-emitting means is specified. The converter comprises a primary-side circuit having a half-bridge and having an LLC resonant circuit. The converter comprises a secondary side, which is galvanically isolated from the primary-side circuit and which has an output for supplying energy to the light-emitting means. The converter comprises a control device for controlling the half-bridge, wherein the control device is configured to detect a load connected to the output of the secondary side depending on a measured variable detected in the primary-side circuit and to control the half-bridge in dependence thereon.

The primary-side circuit can have a resistor, which is connected in series with a switch of the half-bridge. The control device can be configured in such a way that it uses an average value of the current through the resistor or a variable proportional thereto as measured variable.

The control device can be configured to set a frequency at which a first switch and a second switch of the half-bridge are switched in clocked fashion depending on the measured variable in order to at least partially compensate for a load-dependent shift in an output voltage of the converter.

The control device can be configured to change clocking of the half-bridge depending on a supply voltage detected with time resolution of the primary-side circuit.

Configurations of the converter in accordance with advantageous or preferred exemplary embodiments and the effects achieved in each case thereby correspond to the configurations described with reference to the method.

In accordance with a further exemplary embodiment, an LED converter device is provided which comprises the converter in accordance with one exemplary embodiment. The LED converter device can be configured as a constant voltage source.

In accordance with a further exemplary embodiment, a lighting system is specified which comprises the LED converter device and a light-emitting means coupled thereto. The light-emitting means can comprise one or more light-emitting diodes (LEDs). The LEDs can comprise inorganic and/or organic LEDs. The LEDs can be integrated in an LED module, which is implemented separately from the LED converter device. The lighting system can furthermore comprise a central control system, which is configured to transfer commands to the LED converter device or to evaluate signals transferred by the LED converter device.

BRIEF DESCRIPTION OF THE DRAWINGS

The invention will be explained in more detail below with reference to the attached drawing on the basis of preferred exemplary embodiments.

DETAILED DESCRIPTION OF THE PREFERRED EMBODIMENTS

The features of the various exemplary embodiments described below can be combined with one another insofar as this is not expressly ruled out in the description below.

Figure 1:
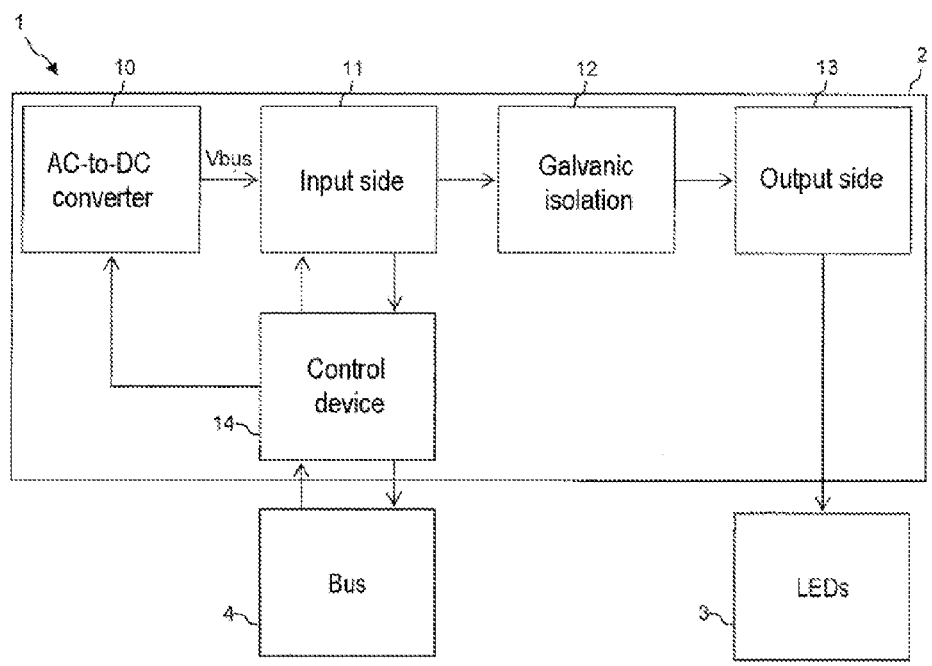
FIG. 1 shows a schematic illustration of a lighting system having an LED converter device in accordance with one exemplary embodiment.

FIG. 1 shows a lighting system 1, in which an operating device 2 in accordance with one exemplary embodiment supplies energy to an LED module having LEDs 3. The operating device 2 can be configured as an LED converter device. The LED converter device 2 can be in the form of a constant voltage source. The LED converter device 2 can comprise an interface for communication with a central control device and can be configured to receive commands via the interface and to output information on the operating state of the LED converter device 2 and/or the LED module with the LEDs 3 via the interface.

The LED converter device 2 can be configured as an SELV device, in which a primary-side circuit (for example a non-SELV side) and a secondary-side circuit (for example an SELV side) are galvanically isolated. The LED converter device 2 can comprise an AC-to-DC converter 10. The AC-to-DC converter 10 can be configured to be coupled to a mains voltage on the input side. The AC-to-DC converter 10 can comprise a so-called smoothing circuit or circuit for power factor correction (PFC). The AC-to-DC converter 10 provides a bus voltage Vbus as supply voltage to a converter, which has an input-side or primary-side circuit 11 and an output-side or secondary-side circuit 13 which is galvanically isolated therefrom. Galvanic isolation is achieved by means of a transformer 12 or another conversion unit.

The LED converter device 2 is configured and operated in such a way that it acts as constant voltage source. In order to at least partially compensate for load-dependent changes in the output voltage which are output to the LEDs, the LED converter device 2 is configured to detect a load to which energy is supplied via the output of the LED converter device 2. In the case of load detection, the load can be quantified at least to the extent that load-dependent changes in the output voltage can be counteracted.

The LED converter device 2 is configured in such a way that the detection of the load which is connected to the output of the secondary side 13 is performed on the primary side of the converter. As will be described in more detail still, a measured variable which provides information on the load and enables quantification of the load is detected in the primary-side circuit 11. An average value over time of a current flowing through the switch on a low-potential side of a half-bridge of the primary-side circuit 11 or, in technically equivalent fashion, a voltage proportional to this current can be used as measured variable. This current through the switch on the low-potential side of the half-bridge can be sampled, for example, via a voltage drop across a measuring resistor, which is connected between the switch of the half-bridge and a reference potential, in particular ground. A shunt resistor of the primary-side circuit, which is in any case provided for safety shutdown, can be used as measuring resistor. The control device 14, which can be configured as an integrated circuit and in particular as an ASIC, processes the measured variable and controls the operation of the LED converter 2 in such a way that load-dependent changes in the output voltage can be at least partially compensated for.

The LED converter device 2 is also configured in such a way that the control for compensation of load-dependent changes in the output voltage is performed on the primary side 11. In particular, the control device 14 can set clocking with which switches in a half-bridge are switched depending on the measured variable detected in the primary-side circuit 11 or on the load represented thereby. The control device 14 can in particular change a frequency at which the switches in the half-bridge are switched.

In the case of the LED converter device 2, load-dependent changes in the output voltage can be reduced without feedback of measured values via the SELV barrier being necessary. In the case of the LED converter device 2, load-dependent changes in the output voltage can be reduced without control of power switches on the secondary side needing to take place for this purpose.

The control device 14 can perform other functions. The control device 14 can regulate the operation of a component of the LED converter device, in particular of the AC-to-DC converter 10, on the basis of a bus voltage Vbus which is supplied as supply voltage to the primary-side circuit 11. The control device 14 can in particular also act as regulator, which keeps the bus voltage Vbus stable. The control device 14 can automatically implement fault identification in order to identify an open output and/or a short circuit. The control device 14 can initiate a corresponding safety shutdown if the measured variable which is detected on the primary side is not within a range of acceptable values for the continuous operation of the LED converter device 2. The control device 14 can alternatively or additionally perform other functions, for example overcurrent protection, in which the output-side current is reduced by changing the clocking of the switches in the half-bridge. The control device 14 can also perform conventional functions in respect of the control of an LED converter device, such as the implementation of commands which are received via a bus 4 or via a wireless interface.

The mode of operation and the design of converters in accordance with exemplary embodiments will be described in more detail with reference to FIGS. 2-14.

Figure 2:
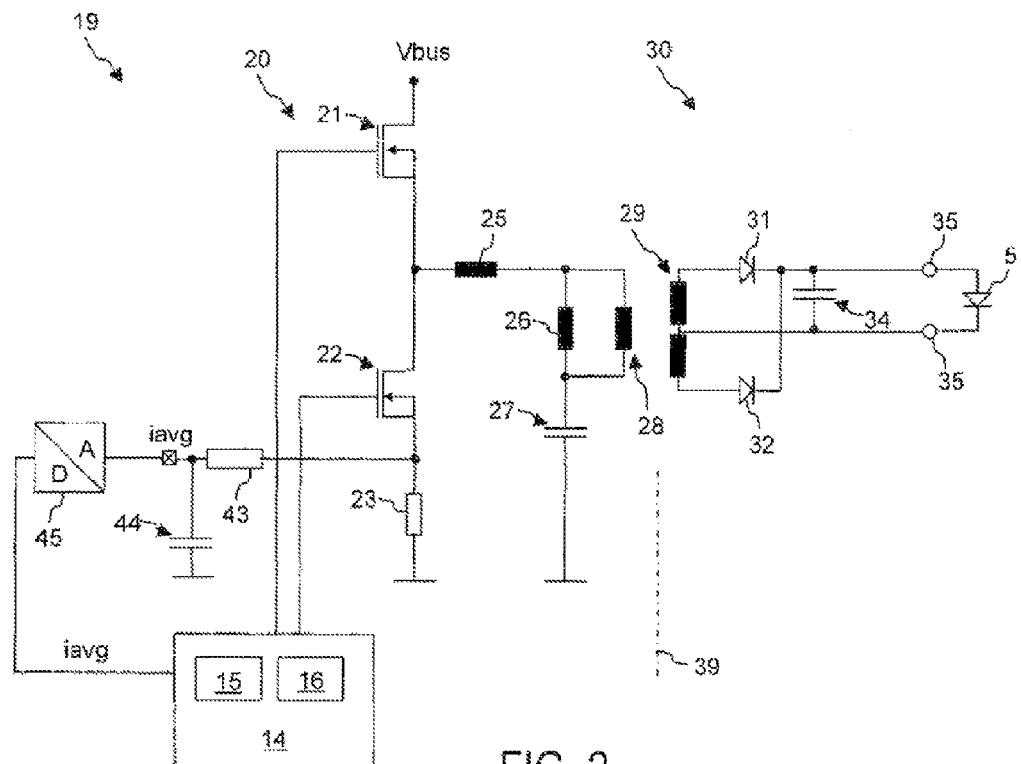
FIG. 2 shows a circuit diagram of a converter in accordance with one exemplary embodiment.

FIG. 2 shows a circuit diagram of a converter 19 in accordance with one exemplary embodiment. The converter 19 comprises a primary-side circuit 20 and a secondary side 30. There is electrical isolation between the primary-side circuit 20 and the secondary side 30. A transformer comprising a primary coil 28 and a secondary coil 29 can be provided for the isolation. The transformer has a magnetizing inductance which can also act as one of the inductances of an LLC resonant circuit. This is represented symbolically in FIG. 2 as the second inductance 26. The converter 19 can be used in the case of the LED converter device 2 or in the case of another operating device for operating LEDs for performing the functions of the primary-side circuit 11 illustrated in FIG. 1, of galvanic isolation 12 and of the secondary side 13. The converter 19 acts as DC-to-DC converter. The secondary side 30 can be an SELV region, which is separated from the primary-side region by an SELV barrier 39. The primary-side circuit 20 can contain all of the components which do not belong to the SELV region.

The primary-side circuit 20 comprises an LLC resonant circuit, which is configured as a series resonant circuit. The LLC resonant circuit has a first inductance 25, a second inductance 26 and a capacitance 27 in a series circuit. In accordance with conventional terminology in this field, the term "LLC resonant circuit" or "LLC resonant converter" is used such that a resonant circuit comprising two inductances and one capacitance or a corresponding converter is denoted thereby, wherein it is irrelevant whether the inductance 26 is connected between the inductance 25 and the capacitor 27 or the capacitor 27 is connected between the inductive elements 25 and 26. The second inductive element 26, as mentioned, represents the magnetizing inductance of the primary coil 28 of the transformer. The second inductive element 26 can be the magnetizing inductance of the resonant circuit, the inductance of which is greater than the first inductance 25. The first inductance 25 can also be integrated in the transformer and can be a leakage inductance, for example. Alternatively, an additional inductance in addition to the primary coil 28 of the transformer can also be arranged and can also act as one of the two inductances of the LLC resonant circuit. Other configurations of the LLC resonant circuit are likewise possible.

The primary-side circuit 20 comprises a half-bridge having a first switch 21, which can be a power switch, and a second switch 22, which can be a power switch. The first switch 21 and the second switch 22 can be identical, and the half-bridge can be in the form of a symmetrical half-bridge. These switches can be in the form of field-effect transistors, for example in the form of MOSFETs. The resonant circuit is connected to a node between the first switch 21 and the second switch 22. The resonant circuit is connected to the center of the half-bridge between the two switches 21 and 22. A first connection of the first inductance 25 of the resonant circuit can be connected to the node between the first switch 21 and the second switch 22 of the half-bridge circuit. A second connection of the first inductance 25 can be connected to a first connection of the second inductance 26 of the resonant circuit. A second connection of the second inductance 26 of the resonant circuit can be connected to a first connection of the capacitance 27.

During operation of the converter 19, the control device 14 controls the first switch 21 and the second switch 22. In this case, each of the switches can each be switched at the same preset frequency. The control device 14 controls the first switch 21 and the second switch 22 in such a way that only ever one of the two switches is switched on. The first switch 21 and the second switch 22 are operated in clocked fashion alternately by the control device 14. The dead time between one switch being switched off and the respective other switch being switched on can be small, in particular much less than the inverse of the switching frequency.

The primary-side circuit 20 is configured in such a way that it detects a measured variable which indicates an average value over time of a current which is flowing from the LLC resonant circuit to ground when the second switch 22 is switched on or which is proportional to such an average value over time of the current. The primary-side circuit 20 can have a corresponding conductor or connection, with which the corresponding measured variable is provided to the control device 14. As will be described in even further detail, such a measured variable enables the determination of the load which is connected to the output of the secondary side 30.

Information on the load 5 at the output 35 of the converter is derived on the basis of the measured variable iavg detected in the primary-side circuit. The measured variable, which is proportional to the average value of the current through the second switch 22, can be provided by virtue of the voltage drop across the shunt resistor 23 being filtered by a low-pass filter. The low-pass filter can comprise, for example, a resistor 43 and a capacitor 44 for averaging over time. The capacitance of the capacitor 44 is selected such that the cutoff frequency of the low-pass filter for the averaging is much lower than the frequency at which the switches 21, 22 of the half-bridge are switched in clocked fashion. The measured variable iavg detected in the primary-side circuit is supplied to the control device 14. The measured variable iavg detected in the primary-side circuit can be A/D-converted via an analog-to-digital converter 45 before it is supplied to the control device 14.

Given a stable supply voltage Vbus to the primary-side circuit 20, the measured variable iavg detected on the primary side has a direct relationship with the load 5 at the output 35 of the secondary side. This enables detection of the load 5 on the basis of the measured variable. The control device 14 also acts as regulator, which keeps the supply voltage Vbus stable and outputs actuating commands corresponding thereto to a part of the LED converter device, for example to the AC-to-DC converter, which is connected upstream of the primary-side circuit 14. If the load 5 changes, for example, owing to a change in the number of LEDs, compensation can be performed by correspondingly changing the clocking of the half-bridge, in the case of which compensation load-dependent effects at the output 35 of the secondary side are at least partially compensated for. The converter 19 is configured in such a way that the output voltage at the output 35 of the secondary side 30 has a preset relationship to the supply voltage Vbus, which is supplied to the primary-side circuit 20. This relationship is also only weakly dependent on the load in the state in which load-dependent effects have not yet been compensated for. Therefore, the measured variable iavg is particularly suitable for detecting the load.

Other configurations for determining the measured variable, which is proportional to a current flowing through the second switch 22, are likewise possible. For example, the voltage, which is proportional to the current through the switch 22, need not be tapped off via the shunt resistor 23, but it is also possible for a separate measuring resistor to be provided which is connected between the second switch 22 and ground. Averaging of the current through the second switch 22 over time does not need to take place on the analog signal, but can also be performed after analog-to-digital conversion, in particular by the control device 14 itself. For this purpose, the current flowing in the low-potential branch of the half-bridge can be A/D converted at a rate which is higher than the switching frequency of the switches 21, 22 in the half-bridge, and the control device 14 can average the sampled signal over time in order to determine iavg.

In order to at least partially compensate for load-dependent changes in the output voltage, the control device 14 can have corresponding logic 15, with which new parameters for the control of the half-bridge are determined depending on the measured variable detected on the primary side. The logic 15 can evaluate a corresponding computational specification which provides a relationship between the measured variable detected on the primary side and a new frequency or a frequency shift for the switching of the switches 21, 22 in the half-bridge. As an alternative or in addition, the control device 14 can comprise a memory 16 with a value table, wherein the logic 15 determines a new frequency or a frequency shift for the switching of the switches 21, 22 in the half-bridge by means of a value table callup depending on the measured variable.

The secondary side 30 has a rectifier which is connected downstream of the secondary coil 29 and which can be formed, for example, by a first diode 31 and a second diode 32. A center of the secondary coil 29 can be coupled to an output of the secondary-side circuit. Ends of the secondary coil 29 can be coupled to the output 35 via the diodes 31 and 32. A charging capacitor 34 can be connected between the outputs of the rectifier.

A load 5 which is connected to the output 35 of the secondary-side circuit 30 or of the converter can comprise an LED or a plurality of LEDs. Since the converter 19 is operated as constant voltage source, the load 5 can be configured in such a way that it has further components, in addition to the LEDs, for generating a corresponding preset operating current for the LEDs from the constant voltage provided by the output 35.

Figure 3:
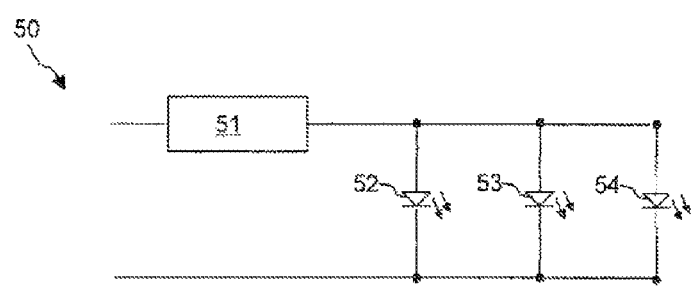
FIG. 3 shows a load to which current can be supplied by the converter in accordance with one exemplary embodiment.

FIG. 3 illustrates schematically the configuration of the load 50, which can be connected as load 5 to the output of the converter 19. The load 50 has a plurality of LEDs 52-54 and electronics 51. The plurality of LEDs 52-54 can be arranged in a series circuit, for example, or else as illustrated in FIG. 3 in a parallel circuit or else in a combination of a series circuit and a parallel circuit. The electronics 51 can be configured in such a way that they receive the output voltage of the converter 20 as operating voltage and supply a preset operating current to the LEDs 52-54.

With reference to FIGS. 4-9, the mode of operation and the operation of the converter in accordance with exemplary embodiments will be described in more detail.

Figure 4:
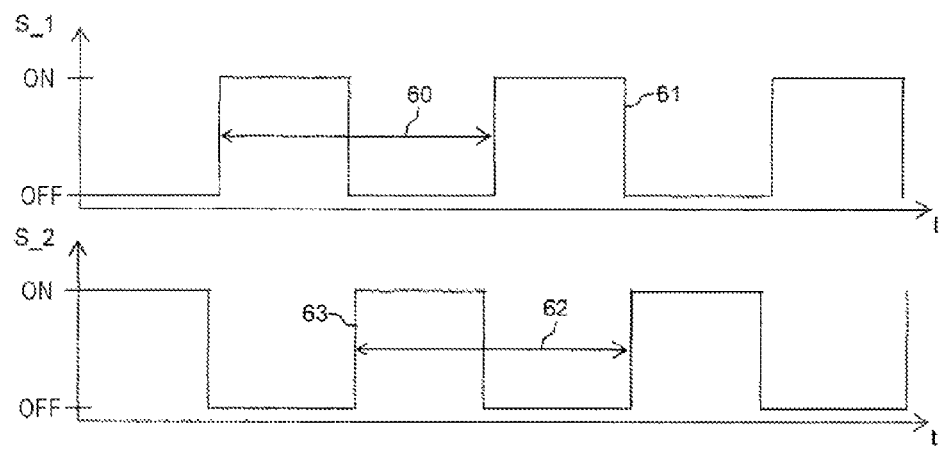
FIG. 4 illustrates gate voltages for driving the half-bridge, which gate voltages are generated by a control device of the converter in accordance with one exemplary embodiment.

FIG. 4 shows schematically the gate voltage 61 applied to the first switch 21 by the control device 14 and the gate voltage 63 applied to the second switch 22, with which the corresponding switch is switched. Both switches are switched periodically at the same frequency, wherein the switches are clocked alternately. A period 60 of the gate voltage 61 for the first switch 21 and a period 62 of the gate voltage 63 for the second switch 22, which can each be defined as the time between successive rising edges of the gate voltage, is identical for both switches. These switches 21 and 22 are thus switched in clocked fashion alternately so that at most only one of the switches is ever on. A dead time between one switch being switched off and the other switch being switched on can be small in comparison with the inverse of the switching frequency, i.e. small in comparison with the period 60, 62.

If, during operation, the clocking of the switches 21, 22 for the compensation of load-dependent effects is changed, this can take place in a variety of ways. In one configuration, the period 60, 62 can be changed correspondingly, wherein the ratio between the on time and the off time is kept constant. In this case, the on time and the off time for each of the switches are extended or shortened correspondingly depending on whether the frequency is decreased or increased. In a further configuration, the on time can be kept constant, while the period 60, 62 and therefore the off time is extended, with the result that the frequency assumes a new value which ensures a consistent output voltage for the detected load.

The frequency at which these switches 21, 22 are switched can be selected depending on the properties and in particular the natural frequency of the LLC series resonant circuit. The switching frequency can be selected such that the period 60, 62 approximately corresponds to the period of a natural oscillation of the LLC resonant circuit. That is to say that each of the switches can be switched in any case in an initial operating state such that it is in the ON state in each case for a time period which approximately corresponds to half the period of a natural oscillation of the LLC resonant circuit. Starting from such a starting value for the clocking of the switches 21, 22, the switching frequency can be adapted in accordance with the load detected on the primary side by means of the measured variable iavg.

Figure 5:
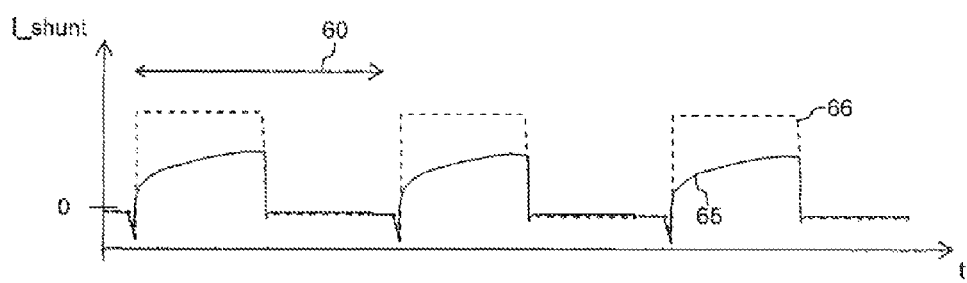
FIG. 5 shows, schematically, a current through a resistor in a primary-side circuit of the converter over time.

FIG. 5 shows schematically the current flowing in the low-potential side of the half-bridge when the second switch 22 between the LLC resonant circuit and ground is switched on, as a function of time. In those half-periods of the oscillation of the LLC resonant circuit in which the second switch 22 is switched on, a corresponding current flows through the second switch 22 and through the shunt resistor 23. This would apply correspondingly when a separate measuring resistor, which is different than the shunt resistor 23, is used. FIG. 5 is only a simplified illustration. At the beginning of the switch-on process of the second switch 22, initially a negative current typically flows. Owing to the resonant output circuit, a certain phase shift between the voltage and the current is also set.

The current 65 which results for a first load and the current 66 which results for a second load are illustrated schematically. The bus voltage Vbus, which supplies power to the primary-side circuit, is kept stable. Therefore, a conclusion can be drawn as to the transferred power or the load connected to the output of the secondary side from the average value of the current 65 or of the current 66 over time.

Figure 6:
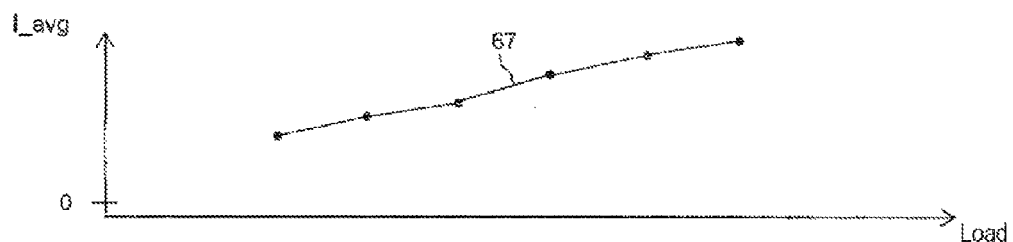
FIG. 6 illustrates the dependence of a measured variable detected in the primary-side circuit of the converter on a load at the output of the converter.

FIG. 6 illustrates schematically the functional dependence of the measured variable 67, which is proportional to the average value I_avg over time of the current through the second switch 22 in the half-bridge, as a function of the load. The load dependence of the measured variable makes it possible to determine the load depending on the detected measured variable. The control device 14 of the converter can automatically determine new parameters for the driving of the half-bridge, for example a new frequency at which the switches 21, 22 are switched. As a result, a consistent output voltage can be provided even when different loads, for example with a different number of LEDs, are connected to the converter 19. The converter detects the load automatically and independently and adapts its operation correspondingly.

Figure 7:
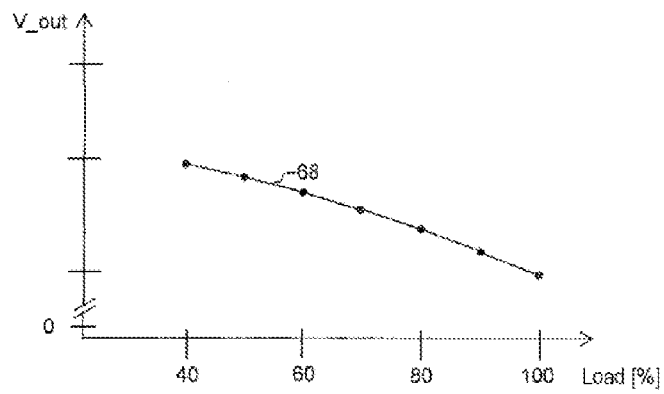
FIG. 7 illustrates a change to be compensated for in an output voltage of the converter as a function of the load.

FIG. 7 illustrates, for an exemplary system, the load dependence which the output voltage 68 would have if the half-bridge of the converter were to always be switched at the same frequency for different loads. In the example illustrated, the output voltage would increase by 4% in the event of a reduction in the load from an initial value (100%) to 40% of the initial value. An example of such a change in the load is the use of a different number of LEDs. The number can also be changed during operation, for example in the event of failure of LEDs.

The functional dependence of the output voltage 68 on the load is known, for example, from the theoretical description of the LLC resonant converter and/or can be determined by measurements.

In the case of LLC resonant converters and methods in accordance with exemplary embodiments, the load is detected on the basis of the measured variable detected on the primary side, and the control of the half-bridge is adapted in such a way that the load-dependent change in the output voltage illustrated in FIG. 7 is counteracted. This can take place, for example, by changing the frequency at which the switches in the half-bridge are switched. A reference frequency for the operation of the switching bridge can be selected such that a preset target output voltage is achieved for a reference load. If the output voltage were to be increased in comparison with the target output voltage in accordance with the load dependence of the output voltage 68 if the half-bridge were to be operated at the reference frequency, the switching frequency can be changed in comparison with the reference frequency. The new switching frequency can be selected such that the output voltage for the detected load again approximates the target output voltage or assumes this value. The new switching frequency can be selected for this purpose, for example, such that the operation of the converter takes place at a frequency which is further removed from the frequency at which the transfer function or gain of the converter has its maximum for the detected load. The operating point of the converter can thus be shifted on the frequency-dependent curve of the transfer function or gain of the converter in such a way that in the case of the detected load, the output voltage is brought closer to the target output voltage again, i.e. the load-dependent increase in the output voltage is counteracted. If, in accordance with the load dependence of the output voltage 68, the output voltage were to decrease in comparison with the target output voltage if the half-bridge were to be operated at the reference frequency, the switching frequency can be changed in comparison with the reference frequency. The new switching frequency can be selected such that the output voltage for the detected load again comes close to the target output voltage or assumes this value. The new switching frequency can be selected, for example, for this purpose in such a way that the operation of the converter takes place at a frequency which is closer to the frequency at which the transfer function or gain of the converter has its maximum for the detected load. The operation point of the converter can therefore be shifted on the frequency-dependent curve of the transfer function or gain of the converter in such a way that in the case of the detected load, the output voltage is again brought closer to the target output voltage, i.e. the load-dependent reduction in the output voltage is counteracted.

The selection of the new switching frequency depending on the measured variable detected on the primary side and the load indicated thereby can be implemented automatically by the control device 14. For this purpose, for example, a computational evaluation of a function can take place, which indicates the new frequency or a frequency shift in comparison with a reference frequency depending on the measured value. The function can be linear in terms of the measured value. There may also be a callup of a value table, which indicates in each case the assigned new switching frequency or a frequency shift in comparison with a reference frequency for different measured variables iavg.

Figure 8:
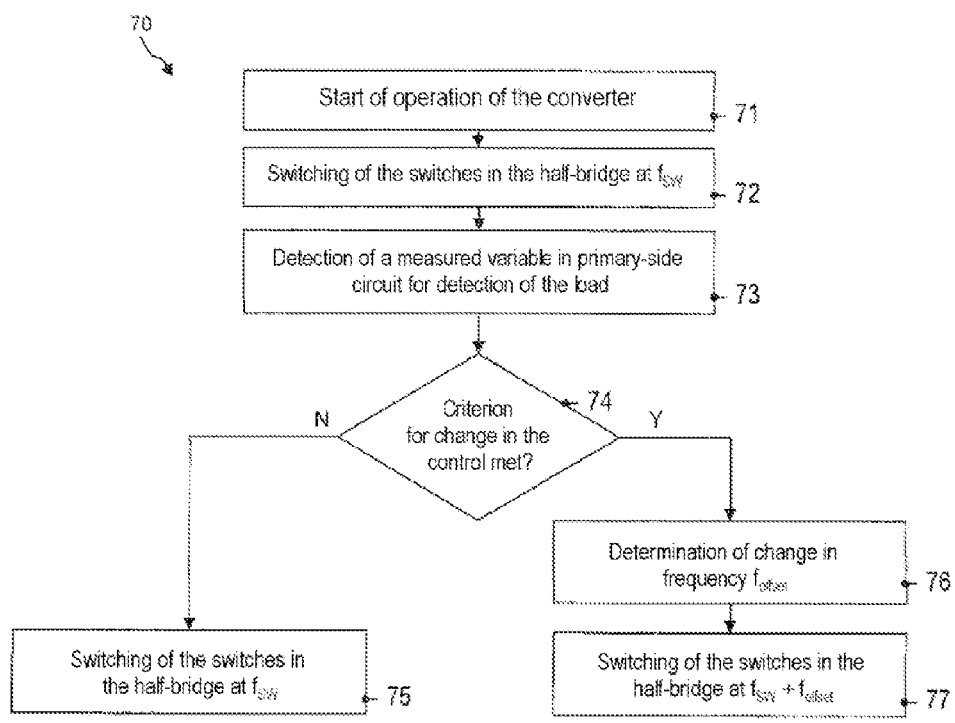
FIG. 8 shows a flowchart of a method in accordance with one exemplary embodiment.

FIG. 8 shows a flowchart of a method 70 which can be implemented by the control device 14 for controlling a converter. The converter can be configured as a converter in accordance with one exemplary embodiment. The converter has an LLC resonant circuit with half-bridge driving. The converter has a primary-side circuit and a secondary side which is isolated galvanically therefrom. The primary-side circuit can be, for example, a non-SELV region of the converter, and the secondary side can be the SELV region of the converter.

At 71, the operation of the converter is started. Once operation has been started, at 72 the switches in the half-bridge of the converter are switched in clocked fashion at a preset reference frequency fSW. This frequency can be matched to the natural frequency of the LLC resonant circuit.

At 73, a measured variable is detected in the primary-side circuit in order to detect the load connected to the output of the secondary side. This can take place while the control of the half-bridge still takes place on the basis of "standard" parameters, wherein, for example, the switches in the half-bridge of the converter are switched in clocked fashion at the preset reference frequency fSW.

At 74, it is possible for a check to be performed to ascertain whether a criterion has been met, in which the adaptation of the control of the half-bridge is intended to take place. The criterion can include, for example, whether the measured variable detected on the primary side is in a determined value range such that the load has a value at which even the control of the half-bridge with the "standard" parameters ensures an output voltage which is sufficiently close to a target output voltage. If there is no adaptation of the control of the half-bridge, at 75 the driving of the half-bridge on the basis of the "standard" parameters can be continued during continued operation of the converter or the LED converter device in which the converter is used. In particular, the switches in the half-bridge can continue to be switched in clocked fashion at the reference frequency fSW.

If it is determined, at 74, that the driving of the half-bridge should be changed, new parameters for the driving of the half-bridge can be determined. For example, at 76, a new frequency at which the switches in the half-bridge are intended to be switched can be determined. For this purpose, a frequency shift foffset through which the frequency is intended to be changed in comparison with the reference frequency can be determined, or the new switching frequency can be determined immediately. As an alternative or in addition, new values for the on and off time of each switch can be determined computationally or be read from a value table. As mentioned, the off time of each switch is typically longer than the on time by the dead time.

At 77, the control of the half-bridge is adapted. The switches can be switched on the basis of the new parameters for the control of the half-bridge determined at 76.

Figure 9:
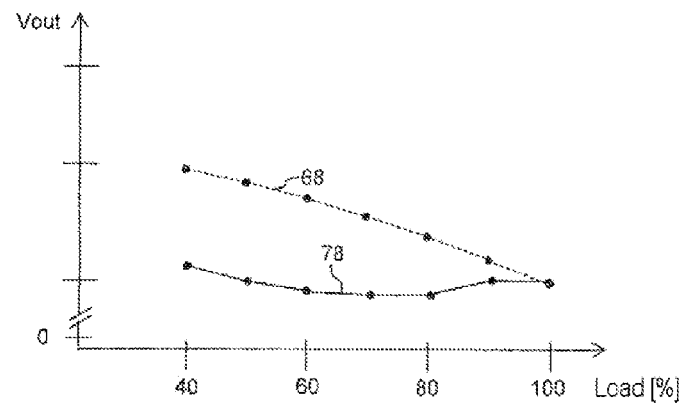
FIG. 9 shows output voltages of the converter for a different number of LEDs to which power is supplied in the application of the method shown in FIG. 8.

FIG. 9 illustrates the effect of methods and apparatuses in accordance with exemplary embodiments in which the load is detected on the primary side and the control of the half-bridge is adapted correspondingly.

The output voltage 78, owing to the compensation which is performed in a load-dependent manner, now only has a weaker load dependence than without any compensation. The data 78 illustrated in FIG. 9 have been determined for a system in which the adaptation of the control of the half-bridge takes place on the basis of a simple model which is linear in terms of the measured variable or load. By using value tables and/or taking into consideration higher orders, the load dependence of the output voltage can be reduced further.

Even for the data 78 illustrated in FIG. 9, for which a linear model was used, the output voltage varies by less than ±0.8% in the event of a reduction in the load from an initial value (100%) to 40% of the initial value. This represents a substantial reduction in comparison with the variation by 4% during operation without any compensation, which is illustrated by the line 68.

Further control functionalities and/or processing steps can be implemented by the control device 14 of the converter in accordance with exemplary embodiments. For example, the control device 14 can detect a supply voltage Vbus of the primary-side circuit of the converter. An AC-to-DC converter and/or a smoothing circuit and/or a circuit for power factor correction can be regulated on the basis of the bus voltage as controlled variable. In this way, the bus voltage can be kept stable.

Furthermore, the control device 14 can also be configured in such a way that the control of the half-bridge is adapted depending on the time dependence of the supply voltage Vbus of the primary-side circuit, in particular depending on a ripple of this voltage.

Figure 10:
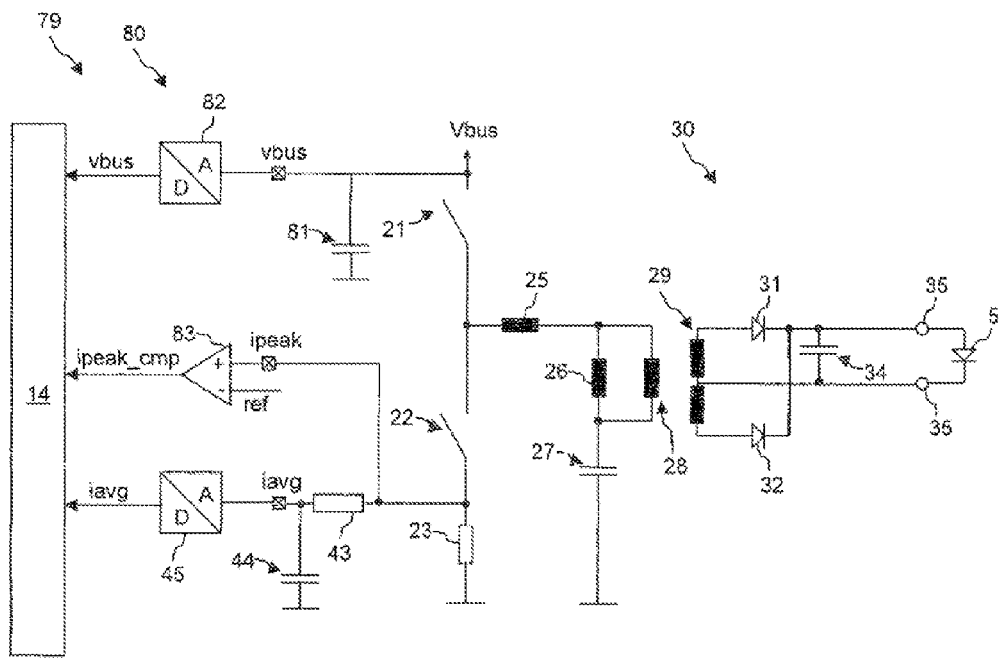
FIG. 10 shows a circuit diagram of a converter in accordance with a further exemplary embodiment.

FIG. 10 shows a circuit diagram of a converter 79 in accordance with a further exemplary embodiment. Elements or devices which correspond in terms of configuration and function to elements or devices which have already been described with reference to FIGS. 1-9 are denoted by the same reference symbols.

The converter 79 has a primary-side circuit 80 having a half-bridge which is operated in clocked fashion and an LLC resonant circuit. The control device 14 detects the load on the basis of the measured variable iavg detected on the primary side and adapts the control of the half-bridge with the switches 21, 22 depending on the load.

The control device 14 can also be configured to provide overcurrent protection. A peak value of the current through the shunt resistor or through another measuring resistor can be monitored in order to activate overcurrent protection selectively. The peak value can be subjected to a threshold value comparison. For this purpose, for example, the peak value ipeak of the current through the shunt resistor can be compared with a threshold value ref. This can be performed easily by a comparator 83. An output signal ipeak_cmp of the comparator can be supplied to the control device 14. Depending on the result of the threshold value comparison of the peak current, the overcurrent protection can be activated. For this purpose, the control device 14 can change the frequency at which the switches 21, 22 in the half-bridge are switched in such a way that the transfer function or gain of the converter assumes a smaller value. The frequency can be changed in such a way that there is a move away from a maximum of the gain curve. The change in the frequency for the overcurrent protection can take place depending on the respectively detected load in order to ensure that a desired reduction in the transferred power and/or the output current is achieved for the frequency-dependent gain curve corresponding to the respectively detected load. Instead of the comparator 83, a computational comparison of the peak value of the current and the reference in the digital domain can also be performed by the control device 14.

The control device 14 can also perform regulation on the supply voltage Vbus of the primary-side circuit. The supply voltage Vbus can be supplied to the control device 14 via a low-pass filter with a capacitor 81 or, for example, also by an RC element and an analog-to-digital converter 82. The capacitance of the capacitor 81 can be selected in such a way that a cutoff frequency of the low-pass filter is greater, in particular much greater, than the ripple of the supply voltage Vbus. This typically has a frequency of approximately 100 Hz. The supply voltage Vbus, which is also referred to as bus voltage, is therefore detected by the control device 14 such that the control device 14 detects the ripple of the supply voltage Vbus. The control device 14 samples the supply voltage at a rate which is greater, in particular much greater, than the period of the voltage ripple of the supply voltage Vbus. The control device 14 can control the AC-to-DC converter 10, the smoothing circuit or circuit for power factor correction in such a way that the average value of the supply voltage Vbus over time is regulated to a setpoint value.

In addition, the control device 14 can adapt, in time-dependent fashion, the control of the half-bridge depending on the supply voltage Vbus of the primary-side circuit 80. For example, the control of the half-bridge can be adapted in time-dependent fashion depending on the ripple of the supply voltage. The frequency at which the switches in the half-bridge are switched to the ON state can be changed in time-dependent fashion, in particular periodically, depending on the ripple of the supply voltage. Even when, owing to the finite period 60, 62 of a switching cycle, as is illustrated in FIG. 4, continuous adaptation of the frequency is not possible, owing to the great difference between the period of the voltage ripple in the supply voltage Vbus and the period 60, 62 of a switching cycle, the period 60, 62 for the clocking of the switches of the half-bridge can be followed virtually continuously in accordance with the voltage ripple of the supply voltage. Thus, for example, in each case after a few switching cycles or after one switching cycle, a new value for the period 60, 62 for the clocking of the switches of the half-bridge can be determined. Typically, there is separation of time scales such that, in a period of voltage ripples of the supply voltage which can have a frequency of 100 Hz, several hundred or even a few thousand switching cycles of the switches in the half-bridge are passed through.

The frequency of the switches in the half-bridge is adapted in this case in such a way that, in the case of a local maximum of the voltage ripple of the supply voltage Vbus, the gain of the converter can be reduced and, in the case of a local minimum of the voltage ripple of the supply voltage, the gain of the converter can be increased. The fluctuations in the supply voltage can therefore in any case be compensated for to a certain extent. The ripple of the output voltage or the output current of the converter can be reduced.

Figure 11:
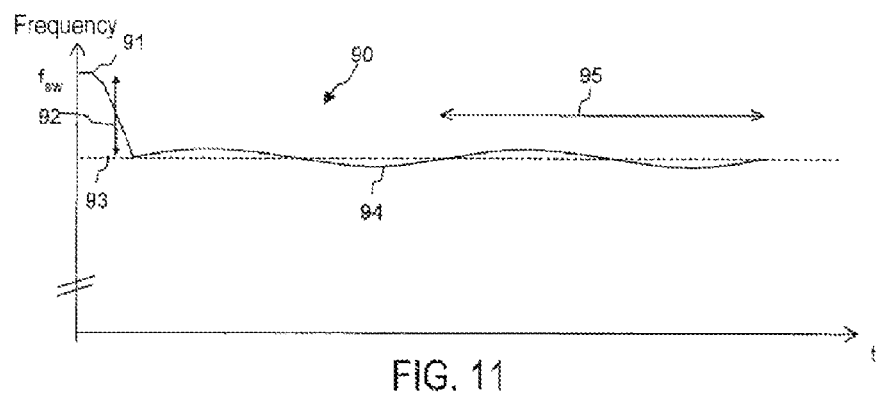
FIG. 11 illustrates a switching frequency of switches in the half-bridge as a function of time in the case of a converter in accordance with one exemplary embodiment.

FIG. 11 illustrates a typical profile 90 of a switching frequency of the switches in the half-bridge during operation of the converter 79.

Initially, the switches can be switched at a reference frequency fSW 91. In this operating state, the measured variable can be detected on the primary side, which enables the detection of the load at the output of the secondary side. Depending on the measured variable or the corresponding load, the control of the half-bridge can be adapted in such a way that the frequency at which the switches are switched is shifted by a frequency difference 92 which may be positive or negative. The frequency can in this case be increased or decreased continuously or quasi-continuously by the frequency difference 92. In the case of operation of the converter which is independent of the ripple of the bus voltage, the switches can then be switched in clocked fashion at the new switching frequency 93.

As illustrated in FIG. 11, the switching frequency can, however, also be changed periodically by the value 93, in accordance with the periodicity of the voltage ripple of the bus voltage Vbus. The corresponding period 95 is much greater than the period of a natural oscillation of the LLC resonant circuit and than the periods 60, 62 coming under consideration for switching cycles of the switches of the half-bridge.

The adaptation of the frequency in accordance with the ripple of the bus voltage Vbus supplied to the primary-side circuit, as illustrated at 94, can be in phase or out of phase with the ripple of the bus voltage Vbus, depending on the working point on the transfer curve of the converter at which the converter is operated. The change takes place in such a way that, in the case of a local maximum of the voltage ripple of the bus voltage Vbus, the increase or reduction in the switching frequency results in a reduction in the value of the transfer function, and/or that, in the case of a local minimum of the voltage ripple of the bus voltage Vbus, the increase or decrease in the switching frequency results in an increase in the value of the transfer function. The mathematical sign and amplitude of the periodic change in the switching frequency 94 are known from the theoretical description of the LLC converter. The control device 14 can use a fixed amplitude for the periodic change in the switching frequency and/or can determine this amplitude computationally or by a query in a value table.

A reduction in the ripple of the output voltage of the converter can already be achieved when the amplitude of the wave-like change in the switching frequency 94 is selected in load-independent fashion. In further configurations, it is even possible to take into consideration the fact that the transfer function of the converter changes as a function of the load. The amplitude of the wave-like change in the switching frequency 94 can be selected depending on the detected load or depending on the measured variable iavg indicating this load. The running of voltage ramps only for the purpose of suppressing electromagnetic interference can thus be omitted.

Figure 12:
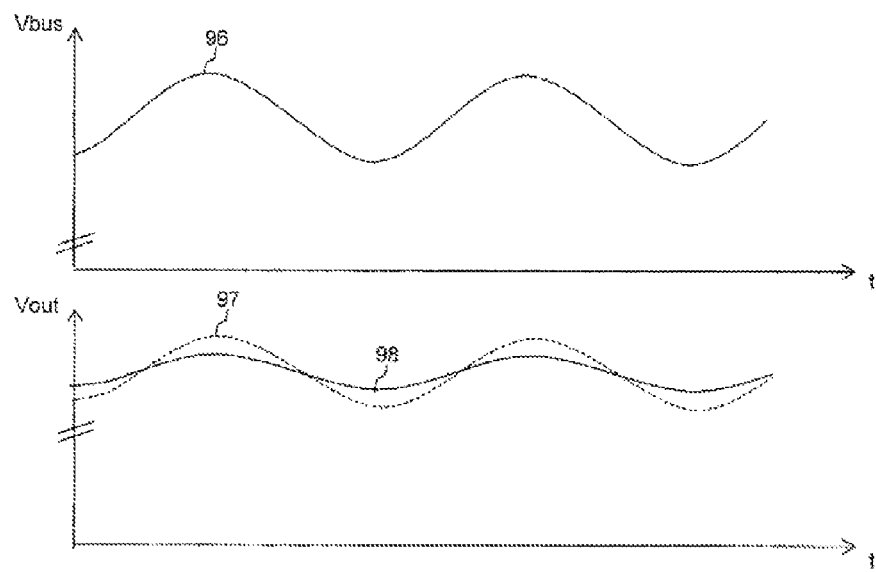
FIG. 12 illustrates a ripple of the output voltage of the converter with correction of a ripple of the bus voltage.

FIG. 12 shows the effect of adapting the controller of the half-bridge depending on the ripple of the supply voltage Vbus 96 of the primary-side circuit. Without any compensation of the ripple, the output voltage 97 likewise has voltage ripple. The amplitude of the voltage ripple can be reduced by control, adapted in time-dependent fashion, of the half-bridge. In the case of adaptation of the control of the half-bridge, an output voltage 98 can be achieved at the output of the converter which has a ripple which is reduced in comparison with the output voltage 97.

The time-dependent adaptation of the switching frequency of the switches in the half-bridge in accordance with the ripple of the bus voltage Vbus can also provide improvements in respect of electromagnetic interference. The time-dependent adaptation can distribute the spectral weight of interference voltages which would be concentrated at a single frequency without any such time-dependent adaptation, over a larger spectral range.

Figure 13:
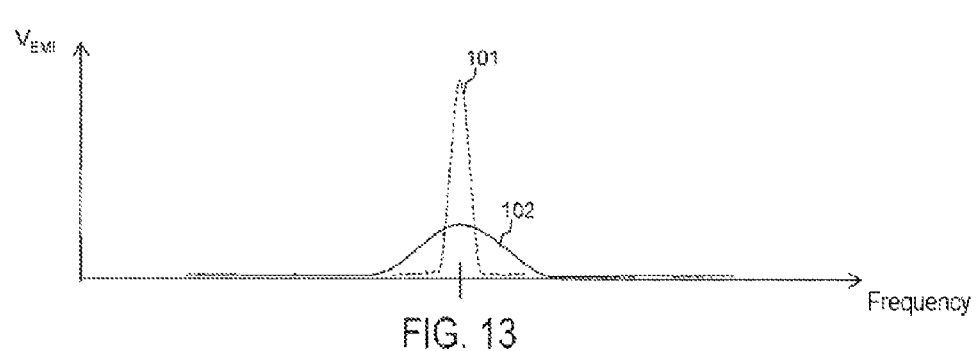
FIG. 13 illustrates an improvement in the electromagnetic interference in converters in accordance with exemplary embodiments.

FIG. 13 illustrates such a spectral broadening in the spectrum of the interference voltage VEMI. During switching of the switches in the half-bridge at a fixed frequency, the spectrum 101 of the interference voltage VEMI has a sharp spectral peak. In the case of time-dependent adaptation of the switching frequency of the switches in the half-bridge in accordance with the ripple of the bus voltage Vbus, the spectrum 102 of the interference voltage VEMI is broadened, so that electromagnetic interference can be reduced.

More complex methods for the control of the half-bridge can be realized in further exemplary embodiments of the invention. For example, for improved adaptability and monitoring of the converter, the control of the half-bridge can take place not only as a result of monitoring of the switching frequency of the switches. The control of the switches in the half-bridge can be combined with a low-frequency pulse-width modulation, in the case of which the half-bridge is switched off in total for certain time periods, i.e. the two switches are switched off for a certain time period. This time period can comprise a plurality of switching cycles of the switches.

Figure 14:
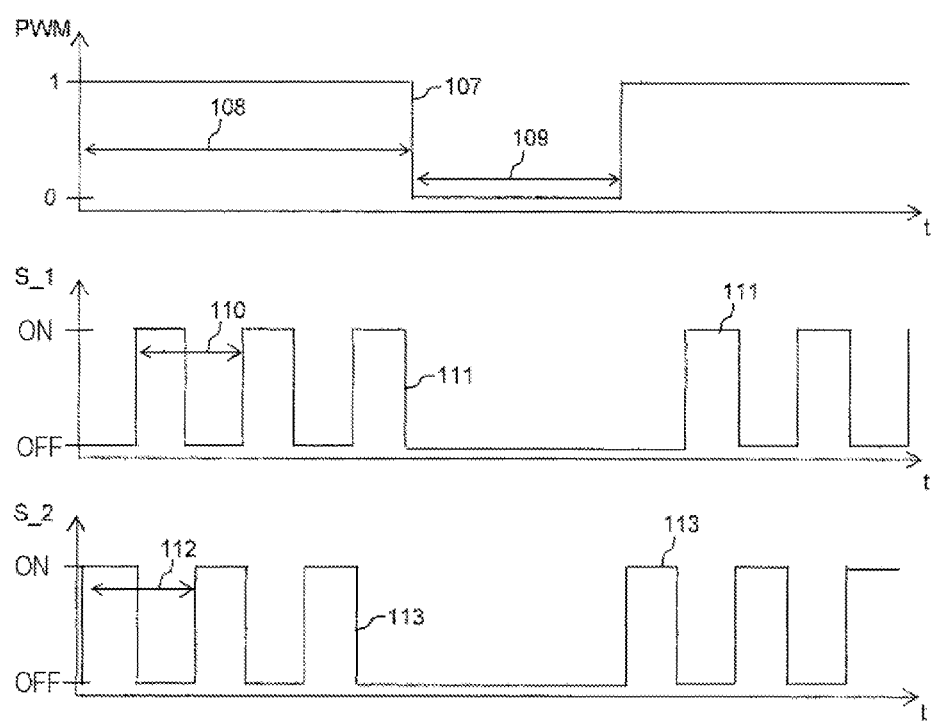
FIG. 14 illustrates gate voltages and low-frequency modulation which are generated by a control device of the converter in accordance with a further exemplary embodiment for half-bridge control.

FIG. 14 illustrates the relevant signals for such a control of the half-bridge. The control device 14 generates a signal 107 for the pulse-width modulation of the half-bridge. In this case, during an on period 108, the first switch and the second switch in the half-bridge are switched in clocked fashion alternately, as has already been described in detail. The corresponding gate voltage 111 for the first switch 21 and the corresponding gate voltage 113 for the second switch 22 in the half-bridge traverses a plurality of switching cycles in the on period 108, which switching cycles each have a period 110 or 112.

In a subsequent off period 109, both the first switch and the second switch remain switched off. The control device 14 can output a corresponding control signal, which ensures that the switches remain switched off during the off period 109. The duration of the off period 109 can comprise several periods 110, 112.

Then, the sequence of on and off periods 108, 109 can be repeated cyclically. The illustration in FIG. 14 is in this case schematic insofar as the duration of the on and off periods 108, 109 can be much greater than the periods 110, 112 and, for example, between a few tens and several thousands of such periods 110, 112. The ratio of the duration of the on and off period 108, 109 can be set automatically by the control device 14 of the converter. The adaptation can take place depending on the measured variable detected on the primary side and/or depending on a desired luminosity.

The use of a primary-side low-frequency pulse-width modulation, in which the half-bridge is switched off during the off period 109, can be combined with operation without such a low-frequency pulse-width modulation. A transition between the two operating types can take place depending on the power which is intended to be transferred by the converter. If the power becomes lower than a threshold value, operation with primary-side low-frequency pulse-width modulation can be initiated. If the power exceeds the threshold value, the operation can be ended without the primary-side low-frequency pulse-width modulation.

While exemplary embodiments have been described with reference to the figures, modifications can be realized in further exemplary embodiments. While the average value of the current through a shunt resistor which is connected between a switch of the half-bridge and ground, can be used as indicator for the load, a corresponding primary-side detection of the load can also be implemented at other elements in the primary-side circuit. For example, a separate measuring resistor can be provided.

The control device of the converters and LED converter device according to exemplary embodiments can be configured as an integrated semiconductor circuit. The control device can be configured as an application-specific special circuit (ASIC: "Application-Specific Integrated Circuit") or another chip. Other configurations of the control device can be used.

Inductances and capacitances can be formed in each case by corresponding inductive or capacitive elements, for example in the form of coils or capacitors. However, it is also possible for smaller inductances, for example the smaller inductance of the LLC resonant circuit, to be formed as stray inductance. Similarly, smaller capacitances than stray capacitances can be formed.

One of the coils in the LLC resonant circuit can be provided in a parallel circuit with a primary coil of the transformer or, in the case of further exemplary embodiments, the primary coil of the transformer can also act as one of the inductances or even both inductances of the LLC resonant circuit.

The converter and method according to exemplary embodiments can be used in particular for the supply of energy to modules having LEDs.

What is claimed is:

1. A method for operating an LLC resonant converter (19; 79) for a light-emitting means (3; 5; 50), wherein the LLC resonant converter (19; 79) has a primary-side circuit (20; 80), which comprises a half-bridge (21, 22) and an LLC resonant circuit (25-27), and a secondary side (13; 30) galvanically isolated therefrom, the method comprising:
controlling the half-bridge (21, 22) by clocked switching of switches (21, 22) of the half-bridge,
detecting a load (3; 5; 50), to which energy is supplied from an output (35) of the secondary side (13; 30), based on a measured variable (iavg) detected in the primary-side circuit (20; 80), and
adapting the control of the half-bridge (21, 22) on the basis of the measured variable (iavg) detected in the primary-side circuit (20; 80), wherein the measured variable (iavg) detected in the primary-side circuit (20; 80) is proportional to an average value of a current and a peak value of the current (ipeak) is detected and an overcurrent protection operating mode for the light-emitting means (3; 5; 50) is initiated selectively depending on a threshold value comparison of the peak value (ipeak).

2. The method as claimed in claim 1, wherein the control of the half-bridge (21, 22) is adapted in such a way that a load-dependent shift in an output voltage (68) of the LLC resonant converter (19; 79) is at least partially compensated for.

3. The method as claimed in claim 2, wherein the adaptation of the control of the half-bridge (21, 22) comprises: setting a frequency (93) at which a first switch (21) and a second switch (22) of the half-bridge are switched in clocked fashion.

4. The method as claimed in claim 3, wherein a control device (14) sets the frequency (93) automatically depending on the measured variable (iavg) using a table value query and/or by computer-based processing of the measured variable (iavg).

5. The method as claimed in claim 4, wherein at least one of the table value query or the computer-based processing is dependent on a load dependence of the output voltage (68) which occurs during permanent clocking of the half-bridge (21, 22).

6. The method as claimed in claim 1, wherein at least one of the following actions is implemented depending on the measured value (iavg): power limitation; fault detection for initiating a fault mode; generation of a signal depending on the measured variable (iavg) and outputting of the signal to a signal bus (4).

7. The method as claimed in claim 1, wherein the measured variable (iavg) detected in the primary-side circuit (20; 80) is proportional to an average value of a current through a resistor (23), which is connected between a switch (22) of the half-bridge and a reference potential.

8. The method as claimed in claim 1, wherein a supply voltage (Vbus; 96) of the primary-side circuit (20; 80) is detected with time resolution, and wherein the control of the half-bridge (21, 22) is changed depending on a change in the supply voltage (Vbus; 96) over time.

9. The method as claimed in claim 8, wherein clocking (94) of the half-bridge (21, 22) is changed in time-dependent fashion, depending on a ripple of the supply voltage (Vbus; 96) of the primary-side circuit (20; 80).

* * * * *